United States Patent [19]

Kondo et al.

[11] Patent Number: 4,844,323
[45] Date of Patent: Jul. 4, 1989

[54] METHOD FOR JOINING CERAMICS

[75] Inventors: Hitoshi Kondo; Hiroaki Kawamura, both of Chiba; Konosuke Inagawa; Tetsuya Abe, both of Ibaragi; Yoshio Murakami, Ibaragi, all of Japan

[73] Assignees: Nihon Sinku Gijutsu Kabusiki Kaisha; Japan Atomic Energy Research Institute, both of Japan

[21] Appl. No.: 159,229

[22] Filed: Feb. 23, 1988

[30] Foreign Application Priority Data

Feb. 26, 1987 [JP] Japan .................................. 62-44887

[51] Int. Cl.⁴ ...................... B23K 20/00; B23K 31/00; C04B 37/02
[52] U.S. Cl. .................................. 228/121; 228/122; 228/124; 228/194; 228/208; 228/248; 228/263.12
[58] Field of Search ............... 228/121, 122, 124, 198, 228/208, 248, 263.12, 193

[56] References Cited

U.S. PATENT DOCUMENTS 3,386,160  6/1968  Milch et al. .................... 228/124 M
4,567,110  1/1986  Jarvinen ............................. 228/124

FOREIGN PATENT DOCUMENTS 184778  10/1984  Japan ................................... 228/122
 81071   5/1985  Japan ................................... 228/121
141681   7/1985  Japan .............................. 228/263.12
200872  10/1985  Japan ................................... 228/122
231471  11/1985  Japan .............................. 228/263.12
 17475   1/1986  Japan .............................. 228/263.12

Primary Examiner—Richard K. Seidel
Assistant Examiner—Samuel M. Heinrich
Attorney, Agent, or Firm—Jones, Day, Reavis & Pogue

[57] ABSTRACT

A method or joining ceramics comprising the steps: of preparing a ceramics body and another body to be connected with the ceramics body; of interposing a layer of ultra-fine particles having smaller size than the surface roughnesses of the contact surfaces of the ceramics body and the other body, the layer having larger thickness than the surface roughnesses, and the ultra-fine particles being reactive with the ceramics body and the other body and forming a reaction produce which has a strong bonding power to the ceramics body and the other body; and then of pressing and heating the piled composition of the ceramics body, other body and layer.

6 Claims, 5 Drawing Sheets

METHOD FOR JOINING CERAMICS

BACKGROUND OF THE INVENTION

1. Field of the Invention

This invention relates to a method for joining ceramics.

2. Description of the Prior Ar

In the prior art, both a "solid phase joining method", using diffusion reaction between solid phases, and a "brazing method", using function of liquid phase are known for joining a ceramics body with a metallic body or ceramics bodies with each other. However, the solid phase joining method is essentially superior relative to the properties of heat resistance and gas-tightness For example, the solid phase joining method for joining the ceramics body of $Al_2O_3$ with the metallic body of SUS405 (a kind of steel) is described in the journal "IONICS" (July, 1985, page 7). Next, this method will be described with reference to FIG. 1.

The joining surface of a ceramics body 4 of $Al_2O_3$ to be joined, is polished with a 1 μm-alumina abrasive material, and the joining surfaces of a metallic body 1 of SUS405, a Nb (niobium) sheet 3 and a Mo (molybdenum) sheet 2 are polished with a No. 800 abrasive paper. Then, they are stacked as shown in FIG. 1. The stacked body is heated and pressed at the temperature of 1300° C. under the pressure of 100 MPa (mega Pascal) for thirty minutes by a hot-isostatic pressing machine (HIP).

The points to be considered in the joining of the ceramics body, are generally as follows:
(1) Relaxation of residual stress due to the thermal expansion coefficient difference between a ceramics body and a body to be joined with the ceramics body.
(2) Control (suppression or promotion) of reaction in the surface boundary.

In the above prior art method, the Nb sheet 3 and the Mo sheet 2 are interposed between the $Al_2O_3$ body 4 and the SUS405 body 1 in order to relax the residual stress of the $Al_1O_3$ body 4 due to the thermal expansion coefficient difference between the $Al_2O_3$ body 4 and SUS405 body 1. The optimum material combination for the relaxation can be selected by the simulation of the internal stress using the finite element method. The thickness of the Nb sheet 3 and Mo sheet 2 are 0.5 mm, respectively.

Further in the above prior art method, the HIP machine is used for promoting the interfacial diffusion reaction. The contact area of the surface boundary should be sufficiently large, and the temperature should be sufficiently high in order that the interfacial diffusion reaction is promoted. In the usual solid-phase bonding method, one of the bodies to be joined with each other or both of them are deformed by the pressing operation so that the contact area between them is increased. In comparison with the joining of the both the metallic bodies, since the elastic coefficient of ceramics is very high, a remarkably high pressure is required for obtaining sufficient contact area of the ceramics body. The HIP machine can impart such a high pressure, and moreover isotropically. Accordingly, the metallic body is not remarkably deformed, but the contact area of the surface boundary between the ceramics body and the metallic body can be large.

However, the HIP machine is very expensive, and the method of using the HIP machine is not very efficient. The apparatus for joining is hard to be scaled-up or increased in size.

SUMMARY OF THE INVENTION

Accordingly, it is an object of this invention to provide a method for joining ceramics by which ceramics can be joined with ceramics or another material under a lower pressure.

Another object of this invention is to provide a method for joining ceramics by which a joining apparatus can be increased in size, and be productive.

In accordance with an aspect of this invention, a method for joining ceramics comprising the steps: (A) of preparing a ceramics body and another body to be joined with said ceramics body; (B) of interposing a layer of ultra-fine particles having smaller size than the surface roughnesses of the contact surfaces of said ceramics body and said other body, said layer having larger thickness than said surface roughnesses, and said ultra-fine particles being reactive with said ceramics body and said other body and forming a reaction product which has a strong bonding power to said ceramics body and said other body thereby forming a reaction product which has a strong bonding power to said ceramics body and said other body; and then (C) of pressing and heating the stacked composition of said ceramics body, other body and layer.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

First, the principle of this invention will be described with reference to FIG. 2.

Figure 1:
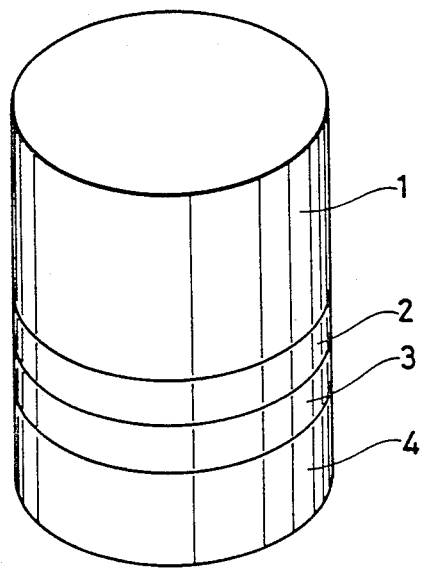
FIG. 1 is a perspective view of a joined or composition body produced by a prior art method.
Figure 2:
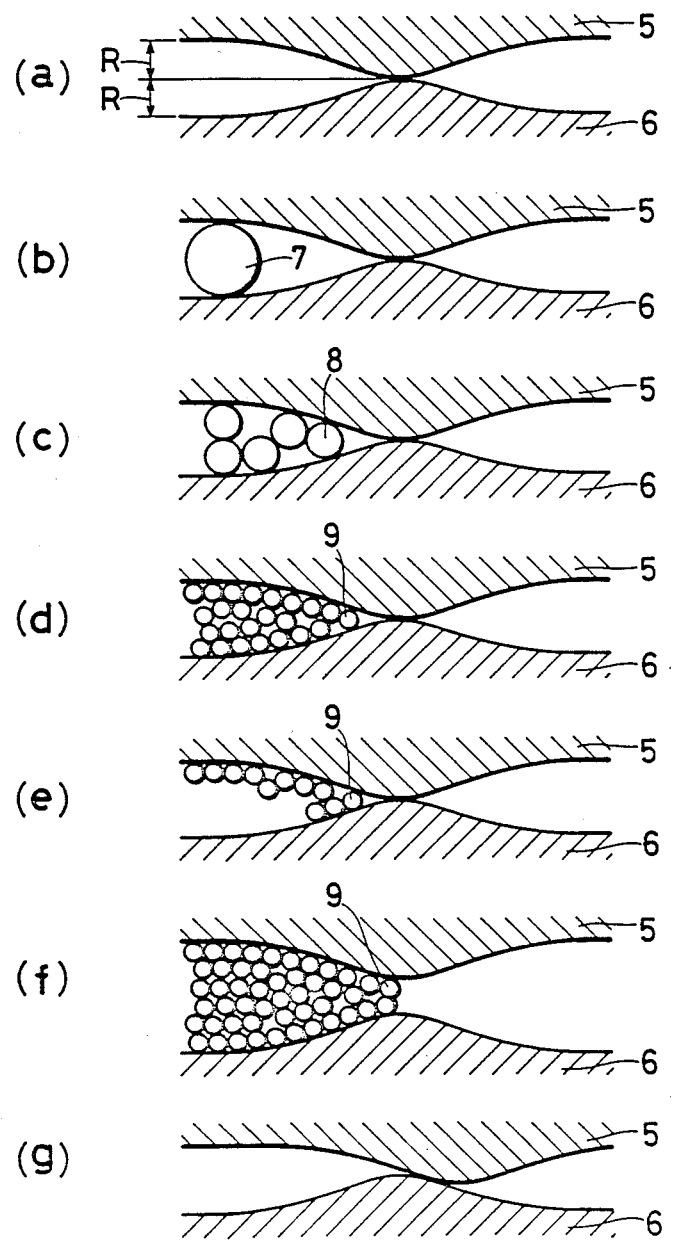
FIG. 2 (a) to (g) are model views for explaining the principle of this invention.

Gaps are made, as shown in FIG. 2 (a), between the contact surfaces of bodies 5 and 6 to be joined with each other, due to the surface roughnesses (natural or artificial) of the contact surfaces of the bodies 5 and 6. According to this invention, these surfaces are filled as pretreatment with a ultra-fine particle layer. Thus, sufficient contact areas can be obtained with a remarkably low pressure or without pressure, in comparison with a prior art method.

Next, the relationship among the surface roughness, the grain size and the thickness of the layer will be described with reference to FIG. 2. In FIG. 2 (b) to (g), reference numerals 7, 8 and 9 represent fine particles of different grain sizes. FIG. 2 (a) is a model view in which the bodies 5 and 6 are contacted with each other. They have the surface roughness R. FIGS. 2 (b) to 2(d) are model views in which the particles 7, 8 and 9 of grain size 2R, R and R/2 respectively are inserted between the contact surfaces with a mean thickness of layer of R. As clear from FIGS. 2(b) to 2(d), the number of contact points, or the contact area, increases with the reduction of the grain size of the fine or ultra fine particles utilized. FIG. 2(a) illustrates the one contact condition in which the peaks and troughs of the contact surfaces are directly facing each other and will enable a particle of grain size equal to 2R diameter to be inserted into the gaps between the contact surfaces of the bodies 5 and 6. On the other hand, when the bodies 5 and 6 are so contacted that the peaks and troughs are displaced from each other, as shown in FIG. 2(g), particle of larger grain size than 2R diameter cannot be inserted into the gaps between the contact surfaces of the bodies 5 and 6.

Accordingly, it is preferable that the particles of grain size be smaller than R. Actually, different peaks and troughs, showing the surface roughness are numerous in the contact surfaces. Contact manner is various. The grain size of the particles of grain which can be inserted in the mean contact manner, is R.

FIG. 2(d) to 2(f) are the model views in which particles 9 of grain size R/2 are inserted into the gaps between the contact surface with mean thickness of layer R, R/2, and 2R, respectively. When the thickness of the layer is equal to R/2 or less than R/2, the contact points joining the connecting surface are less. On the other hand, when the thickness of the layer is equal to R, or 2R, or larger than 2R, the number of the contact points or the contact areas becomes sufficiently large. Accordingly, the thickness of the layer is made to be larger than R.

Figure 3:
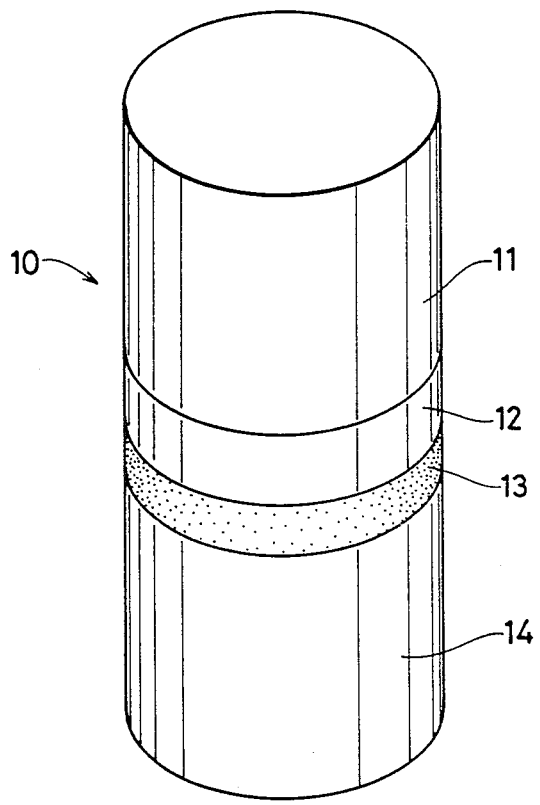
FIG. 3 is a perspective view of a composition body produced by an embodiment of a method used according to this invention.

FIG. 3 shows a composition body 10 which has been made by the principle of this invention. The point in which it is essentially different from the composition of the prior art, is that a fine particle layer 13 of Nb is inserted between the body 14 of $Al_2O_3$ as well as Nb sheet 12, as a single stress relaxation layer. A reference numeral 11 represents a body of SUS405 to be joined with the body 14. In this embodiment, the Nb sheet 12 (2 mm thick) as a stress relaxation layer is single. This embodiment is different from the prior art composition body in a single stress relaxation layer.

Next, a manufacturing apparatus for manufacturing the composition body 10 of FIG. 3 will be described with reference to FIG. 4.

A heating chamber 18 is formed integrally with a vacuum tank 15. A punch rod 16 is vertically arranged and it is driven upwards and downwards by an oil pressure apparatus 20. In the heating chamber 18, a heater 19 is arranged around the punch rod 16. A heat shield plate 21 is arranged at a boundary region between the vacuum tank 15 and the heating chamber 18.

The body 14 of $Al_2O_3$ is put on the upper surface of the punch rod 16. Further a Nb fine particle layer is to be formed on the upper surface of the body 14 of $Al_2O_3$, as described hereinafter. Another punch rod 22 is vertically arranged directly above the punch rod 16. It is driven upwards and downwards by another oil pressure apparatus 25. A recess 22b is formed in the lower end of the punch rod 22. The body 11 of SUS405 and Nb sheet 12 are piled and arranged in the recess 22b. They are supported by hooks 22a formed on the lower end of the punch rod 22.

An arc plasma generating apparatus 29 is arranged in the left region of the interior of the vacuum tank 15. A hearth 26 is arranged in the face of an electrode 28 of the apparatus 29. Nb 27 as evaporation material is put on the hearth 26. A DC power source 31 is connected between the arc plasma genrating apparatus 29 and the hearth 26. A conduit 23 is connected to the arc-plasma generating apparatus 29. A valve 30 is connected to the conduit 23. Gas flow of $(Ar+H_2)$ discharged from the annular space around the electrode 28 of the arc-plasma generating apparatus 29 and can be adjusted by the valve 30. A discharge port 35 is formed at the right end wall of the vacuum tank 15. A exhaust apparatus 37 is connected to the discharge port 35. A valve 36 is further connected to the discharge port 35. The exhausting rate is adjusted by the valve 36.

The manufacturing apparatus of this embodiment is constructed as above described. Next, operation and advantage of this embodiment will be more fully described.

First, the contact surfaces of the body 14 of $Al_2O_3$, Nb sheet 12 and the metallic body 11 of SUS405 are polished with a No. 1000 abrasive paper, so that each the surface roughness R is made about 1 $\mu$m. Then, the body 14 of $Al_2O_3$, and the stack of the Nb sheet 12 and the body 11 of SUS405 are stacked and put on the upper surface of the punch rod 16 and the recess 22b of the punch rod 22, respectively as shown in FIG. 4. Then the vacuum tank 15 is exhausted to the vacuum degree of $5\times10^{-6}$ Torr by the exhausting apparatus 37. Next, a gas mixture $(Ar+H_2)$ is introduced into the vacuum tank 15 at the flow rate of 5 l/min by adjusting the valve 30. The interior of the vacuum tank 15 is maintained at the predetermined pressure of 100 Torr by adjusting the valve 36.

Discharging arc 32 is generated between the electrode 28 and the material 27. Nb atoms are evaporated and coagulated to fine particle smoke 33 which particle grain size of 0.01 $\mu$m. That phenomenon is the so-called gas evaporation method (technique). The Nb atoms adhere on the $Al_2O_3$ as a body to be joined and piled up thereon. Thus, a Nb fine particle layer 34 is formed on the $Al_2O_3$ body 14. The thickness of the layer 34 can be arbitrarily adjusted by the output and discharging time of the apparatus 29. The thickness is different from that of the layer 13 of FIG. 3. Accordingly, the reference numerals are made different from each other.

After the formation of the Nb fine particle layer 34, the punch rod 16 is moved downwards by the oil pressure apparatus 20, while the interior of the vacuum tank 15 is exhausted. The body 14 of $Al_2O_3$ is positioned at the center of the heater 19. At the same time, the Nb sheet 12 and the body 11 of SUS405 supported by the punch rod 22 are moved downwards by the oil pressure apparatus 25. Thus, the surfaces of the bodies are contcted with each other. A pressure of 5 MPa is applied to the bodies to be joined each other by the drives of the oil pressure apparatus 20 and 25. A current is made to flow through the heater 19 to heat the bodies to the temperature of 1100° C. It is maintained at the temperature of 1100° C. for ten minutes. Then, the drives of the oil pressure apparatus 20 and 25 are stopped and the pressure is released. The bodies are heated to the higher temperature of 1300° C. without pressure. It is maintained at this temperature for thirty minutes. The heating is effected under the vacuum of about $10^{-5}$ Torr.

Action of the Nb fine particle layer 34 in the above operation is as follows. Nb as material constituting the fine particle layer 34 has good affinity with oxygen. Accordingly, when the contact area between the body 14 of the $Al_2O_3$ and the fine particle layer 34 is sufficiently large, oxygen is diffused into the fine particle layer 34 from the body 14 of $Al_2O_3$ to form a reaction layer which binds the body 14 and the fine. particle layer 34. Since the fine particle layer 34 of Nb and Nb sheet 12 are made of the same material, they can be easily combined with each other by heating. The size of the Nb fine particle constituting the fine particle layer 34 is 0.01 μm and so it is sufficiently small in comparison with the surface roughness (about 1 μm) of the contact surfaces of the $Al_2O_3$ and Nb sheet 12. Accordingly, a remarkably large contact area can be obtained with small pressure. In this embodiment, the reduction force of Nb is a drive force for combining the bodies. Accordingly, the formation of the Nb fine particles, the formation of the fine particle layer 34, the contact of the bodies to be joined with each other, and the heating-pressurizing operation are consistently effected in the same vaccum tank 15, in order to maintain high activity of Nb fine particles. It can be thus avoided that the Nb fine particles contact with the atmosphere. The heating chamber 18 and the interior of the vacuum tank 15 communicate with each other, although the heat shielding plate 21 is arranged between them.

The actions of the above pressurizing - heating treatment are as follows: The bodies are heated at the temperature of 1100° C. under the pressure of 5 MPa, so that the sintering of the Nb fine particles is processed and at the same time, the solid phase bondings between the body 11 of SUS405 and Nb sheet 12 and between the Nb sheet 12 and Nb fine particle layer 34 are effected. The temperature should be increased in order to strengthen the bonding between the Nb fine particle layer 34 and the body 14 of $Al_2O_3$. However, the deformation of the body 11 of SUS405 becomes remarkable at the higher temperature than 1100° C. Accordingly, when the temperature is increased from 1100° C. to 1300° C. and is maintained at 1300° C., no pressure is applied to the bodies. After the above treatment, the tensile strength of the composition body was measured.

Figure 4:
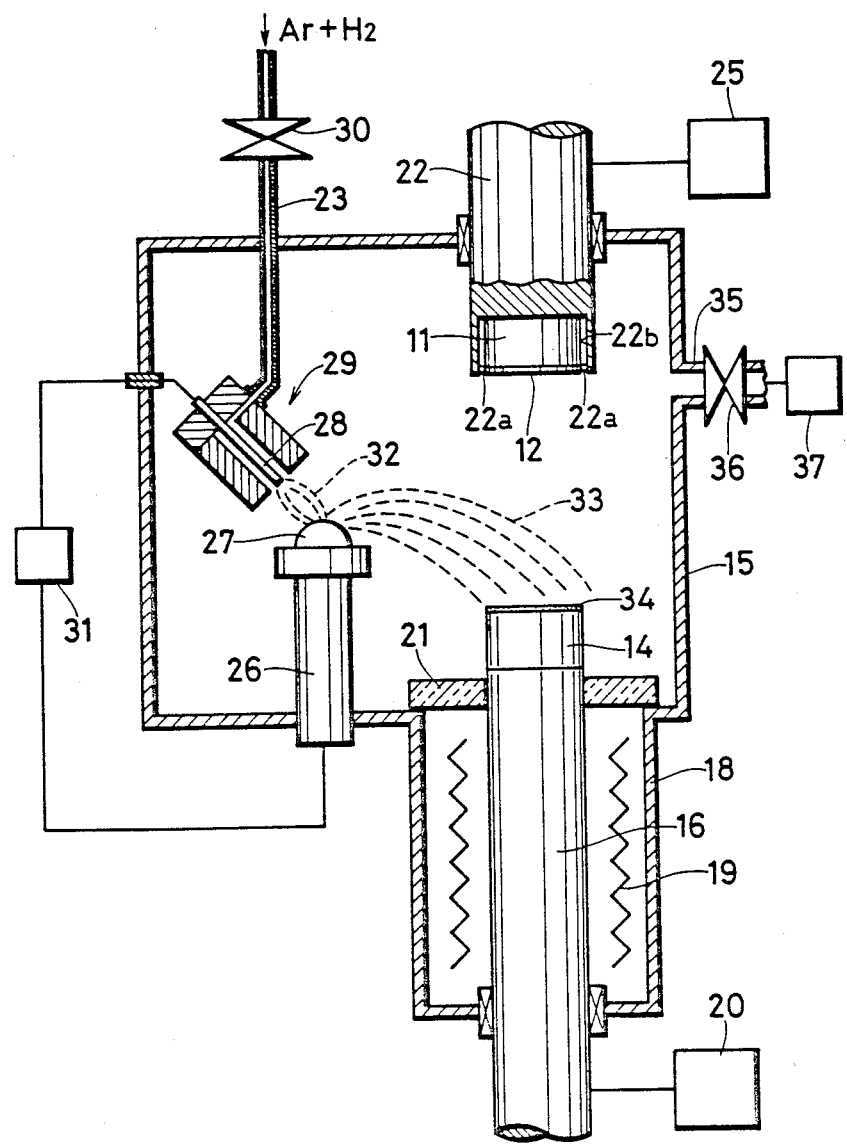
FIG. 4 is a cross-sectional view of a manufacturing apparatus for producing the composition body of FIG. 3.
Figure 5:
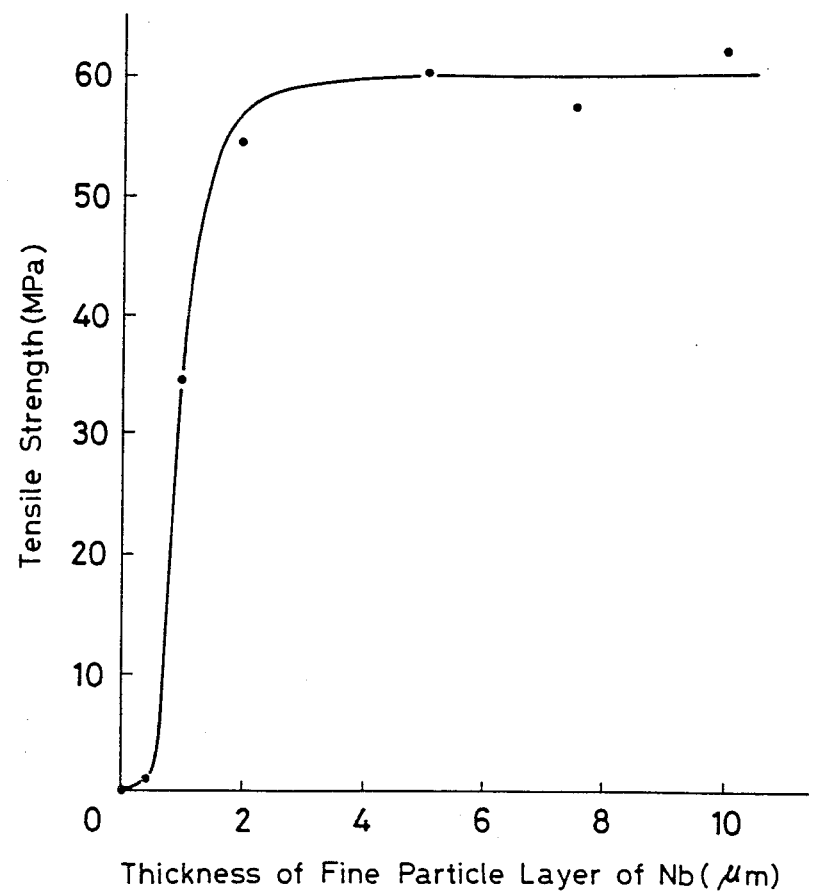
FIG. 5 is a graph showing the relationship between the tensile strength of the composition body produced by the apparatus of FIG. 4 and the thickness of the layer of ultra-fine particles.

FIG. 5 shows the relationship between the tensile strength of the composition body produced by the apparatus of FIG. 4 and the thickness of the Nb fine particle layer 34. As understood from FIG. 5, the tensile strength steeply rises at the layer thickness of about 1 μm which is equal to the surface roughnesses of the contact surfaces of the $Al_2O_3$ body 14 and Nb sheet 12. The tensile strength is saturated beyond 3 μm. The saturation value of the tensile strength is equal to about 60 MPa. The tensile strength of the composition body produced by the prior art method, in which it is processed at the temperature of 1300° C. under the pressure of 100 MPa for thirty minutes by the HIP machine, is equal to about 63 MPa. Accordingly, the saturated tensile strength of the composition body of this invention is substantially equal to the tensile strength of the composition body produced by the prior art method. The thickness of the fine particle layer was obtained from the conversion of the total weight of the adhering fine particles and is on the assumption that the gaps between the contact surfaces are filled with Nb atoms approximately euqal to a density of 100%.

While the preferred embodiment has been described, variations thereto will occur to those skilled in the art within the scope of the present inventive concepts which are delineated by the forth coming claims.

For example in the above embodiment, the arc-discharging heating operation is employed for the fine-particle generating source. Instead, a laser-beam heating operation or electron-beam heating operation may be employed for accomplishing the sme objective.

Further, in the above embodiment the gas evaporation method is employed for generating fine particles. Instead, a chemical gas phase reaction method may be employed for accomplishing the same objective.

Further, other active metal such as Ti (Titanium) or Zr (Zirconium), or ceramic fine particles may be used as the material of the fine particle layer, instead of Nb.

In the above embodiment, $Al_2O_3$ and SUS405 are used as a combination of the bodies to be joined with each other. Instead, other ceramics body such as $Si_3N_4$ or Sic and another metallic body such as SUS304 steel may be used as the combination. Or ceramics bodies may be connected with each other. The material for the fine particle layer, for the stress relaxation, for the treatment pressure and for the treatment temperature are determined in accordance with the kind of the combination selected.

When fine particle of the material for the fine particle layer does not change in nature under the atmosphere, such as oxide, the layer of the same material may be coated on the surface of the ceramics or metal by a spray.

What is claimed is:

1. A method for joining ceramics comprising the steps:
    (A) of preparing a ceramics body and other body to be joined with said ceramics body;
    (B) of interposing a layer of ultra-fine particles having smaller size than the surface roughnesses of the contact surfaces of said ceramics body and said other body, said layer having larger thickness than said surface roughnesses, said ultra-fine particles being reactive for solid-phase diffusion joining with said ceramics body and said other body and forming a reaction product which has a strong bonding power to said ceramics body and said other body; and then
    (C) of pressing and heating the stacked composition of said ceramics body, other body and layer.

2. A method according to claim 1, in which said other body is made of ceramics.

3. A method according to claim 1, in which said other body is made of metal.

4. A method according to claim 1, in which said ceramics body is made mainly of $Al_2O_3$.

5. A method according to claim 4, in which said ultra-fine particles are made of Nb (Niobium).

6. A method according to claim 5, in which a Nb sheet is further interposed between said layer and said other body.

* * * * *